(12) United States Patent
Anai et al.

(10) Patent No.: US 7,787,689 B2
(45) Date of Patent: Aug. 31, 2010

(54) LOCATION MEASURING DEVICE AND METHOD

(75) Inventors: Tetsuji Anai, Tokyo (JP); Nobuo Kochi, Tokyo (JP); Hitoshi Otani, Tokyo (JP)

(73) Assignee: Topcon Corporation, Tokyo (JP)

( * ) Notice: Subject to any disclaimer, the term of this patent is extended or adjusted under 35 U.S.C. 154(b) by 184 days.

(21) Appl. No.: 12/166,654

(22) Filed: Jul. 2, 2008

(65) Prior Publication Data

US 2009/0175497 A1  Jul. 9, 2009

(30) Foreign Application Priority Data

Jul. 6, 2007  (JP)  ............................. 2007-179036
Jul. 6, 2007  (JP)  ............................. 2007-179037

(51) Int. Cl.
  G06K 9/00  (2006.01)
  H04N 7/18  (2006.01)
(52) U.S. Cl. ..................... 382/154; 382/103; 348/129
(58) Field of Classification Search ............ 382/100, 382/103, 104, 106, 107, 154, 168, 181, 190–194, 382/199, 209, 232, 254, 274, 276, 286, 291–295, 382/305, 312; 348/218.1, 188, 207.99, 223.1, 348/187, 129; 396/55
See application file for complete search history.

(56) References Cited

U.S. PATENT DOCUMENTS

| | | | | |
|---|---|---|---|---|
| 6,047,134 | A * | 4/2000 | Sekine et al. ................. | 396/55 |
| 7,023,472 | B1 * | 4/2006 | Kang et al. ................. | 348/187 |
| 7,126,630 | B1 * | 10/2006 | Lee et al. ................. | 348/218.1 |
| 7,181,081 | B2 * | 2/2007 | Sandrew ..................... | 382/254 |
| 2001/0045980 | A1 * | 11/2001 | Leonard ..................... | 348/129 |
| 2003/0007077 | A1 * | 1/2003 | Maggi ..................... | 348/223.1 |
| 2004/0066454 | A1 * | 4/2004 | Otani et al. ................. | 348/188 |
| 2004/0189805 | A1 * | 9/2004 | Seitz ......................... | 348/188 |
| 2005/0099502 | A1 * | 5/2005 | Kang .................... | 348/207.99 |

FOREIGN PATENT DOCUMENTS

JP  2007-183256 A  7/2007

OTHER PUBLICATIONS

U.S. Appl. No. 12/166,660, filed Jul. 2, 2008, Kochi et al.
H.P. Moravec. "Towards Automatic Visual Obstacle Avoidance", 5th International Joint Conference on Artificial Intelligence, 1977.

(Continued)

Primary Examiner—Seyed Azarian
(74) Attorney, Agent, or Firm—Foley & Lardner LLP

(57) ABSTRACT

With apparatus and method for measuring in three dimensions by applying an estimating process to points corresponding to feature points in a plurality of motion image frames, high speed and high accuracy are realized. The apparatus comprises: a first track determining section (4B) that determines corresponding points of feature points extracted from frames of motion images and estimates by robust estimation a coordinate transformation projection parameters between frames using part of the determined corresponding points, a second track determining section (4C) that utilizes the estimated value to determine coordinate values of estimated location of each corresponding point, to determine residuals of the coordinate values relative to the estimated values for each corresponding point, to apply threshold process, and to exclude points of large residuals as incorrect corresponding points. Three-dimensional measurement is carried out by tracking again feature points while removing those incorrect corresponding points.

7 Claims, 12 Drawing Sheets

OTHER PUBLICATIONS

M. Akiyama et al., "Photogammetry", Sankaido Publishing Co., Ltd, Apr. 30, 2001, Japan, pp. 234-235.

N. Kochi, U.S. PTO Office Action, U.S. Appl. No. 12/166,660, dated Apr. 7, 2010, 8 pages.

* cited by examiner

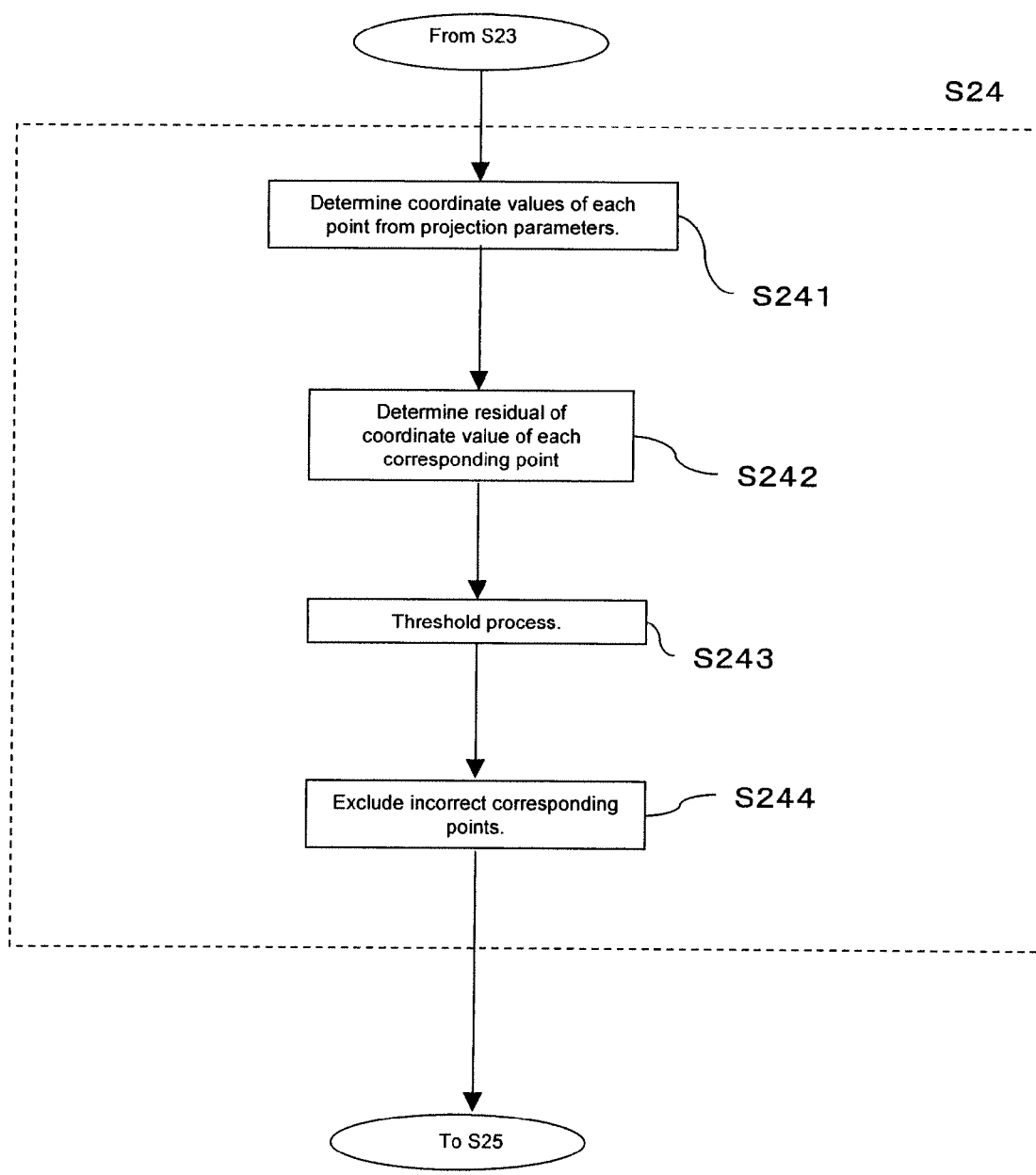

US 7,787,689 B2

LOCATION MEASURING DEVICE AND METHOD

BACKGROUND OF THE INVENTION

1. Technical Field

This invention relates to a location measuring device and a location measuring method. More specifically, this invention relates to such a location measuring device and a location measuring method that obtain three-dimensional coordinates of a camera or an object from motion images of the object photographed by moving the camera relative to the object.

2. Related Art

There is a technique to measure the location of an object or a camera itself using images of the object which the camera picks up in succession while the camera makes motion relative to the object. With this technique, a plurality of images are photographed at a distance and corresponding points between the images are tracked, a stereo pair is set up from two of the images, model images are made, and bundle adjustment is made on the basis of the plurality of images to obtain final and three-dimensional measurement results. Such a technique is disclosed for example in the Patent Document 1.

[Patent Document 1] JP-A-2007-183256

The conventional technique described above is constituted to include the steps of: extracting feature points from a shot image, tracking in real time candidate points corresponding to the feature points on a plurality of images photographed before and after taking the shot image, determining the corresponding points from the tracked result, and calculating coordinates of the camera location or the object location using the determined corresponding points. This process includes, as will be described later, the following operation steps: relative orientation to determine a model coordinate systems so that two images forming a stereo pair satisfy specific conditions (such as coplanar condition, colinear condition, vertical parallax removal condition, etc.), and bundle adjustment for adjusting a plurality of model coordinates to determine the travel of the camera. The above processes and calculation steps respectively are accompanied by calculating operations to determine likable coordinate values and coordinate transformation parameters from a large number of observation data containing errors. Conventionally, the above calculations have often used the least squares method.

However, there are problems as described below: If feature points have incorrect corresponding points in finding three-dimensional coordinates of the camera itself or the object, there may be cases in which the three-dimensional coordinates are not determined accurately, and moreover the solution does not converge in the process of calculation, leading to inability of tracking. The error in the tracking section occurs for example when corresponding points, which are incorrect or inappropriate for calculation (for example, points (tree leaves or the like) that are moving gently, quasi corresponding points or points that feigns to be coincident), are included. In that case, calculation in later steps deteriorates in accuracy and, in the worst case, the solution does not converge. Similar situation occurs also when a stereo pair containing many of such points is chosen. When convergence of solution deteriorates, calculation speed decreases. Even if model coordinates are calculated successfully and bundle adjustment is applied while they contain errors, accuracy may deteriorate due to insufficient removal of large errors. Besides, if large errors remain or some points remain with large errors, estimating calculation using the least squares method consequently takes much time for convergence, and real time processing cannot be carried out.

Therefore, the object of the present invention is to provide a device and a method that make three-dimensional measurement of the location of an object or the apparatus itself at a high speed and with a high accuracy.

SUMMARY OF THE INVENTION

To solve the above problems, a location measuring device in the aspect (1) of the invention includes as shown in FIG. 1 for example: a feature point extracting section 3 for extracting a plurality of feature points on a photographing object from each of successively photographed images in a plurality of frames obtained with an image obtaining means 2, a location of the image obtaining means relatively varying to a location of the photographing object with time; a feature point tracking section 4A for searching each of the successively photographed images for points corresponding to the feature points and tracking the feature points; a first track determining section 4B for applying robust estimation to residuals, each of the residuals being a residual of a coordinate calculated by using a set of projection parameters between one and another images on a basis of locational relationship between the feature points on the one and the another images from a process of the tracking or results of the tracking by the feature point tracking section 4A and determining an estimated value of the projection parameters; a second track determining section 4C for determining a residual between a coordinate of the corresponding point corresponding to each of the feature points and an estimated coordinate of the corresponding point by utilizing the estimated value of the projection parameters determined with the first track determining section 4B, applying a threshold process, determining whether or not the each of feature points is incorrect corresponding point, and removing the incorrect corresponding points from the feature point; a template re-matching section 4D for determining an estimated of the corresponding point by utilizing the estimated value of the projection parameters determined with the first track determining section 4B, and carrying out template matching in a vicinity of the estimated coordinate to determine a coordinate of each of appropriate corresponding points; and a location measuring section 7 for measuring a coordinate of the photographing object, or the location or a photographing posture of the image obtaining means 2 on a basis of coordinates of the corresponding points other than the incorrect corresponding points determined with the second track determining section and on a basis of the coordinates of the appropriate corresponding points determined with the template re-matching section 4D.

Here, the robust estimation is a method that may be carried out relatively easily even when observation data include those having large errors. Methods belonging to this type are for example: LMeds method, median estimation (M estimation) method, and RANSAC method. The threshold process is to compare data with a predetermined threshold and eliminate or choose data depending on their relative magnitudes. With the above arrangement, as large errors are eliminated before each estimating calculation process, calculation converges quickly and gives results of high accuracy. Incidentally, in the phrase "from the process or results of the feature point tracking section 4A" in the above paragraph, the term "process" relates to a real time process carried out while receiving the results of tracking; and the term "results" relates to a non-real time process in which tracked results are once stored for a later process.

Aspect (2) of the invention specifies that the robust estimation in the aspect (1) is one of the LMedS method, median estimation (M estimation) method, and RANSAC (random sample consensus) method. Constituting in this way permits to eliminate large errors before each estimation calculation process with a small burden and simple steps, so that calculation converges quickly and gives measurement results of high accuracy.

In Aspect (3) of the invention, based on the aspect (1) or (2), as shown in FIG. 1 and FIG. 3B, for example, the first track determining section determines a set of projection parameters between the photographed images from a plurality of partial feature points chosen out of the plurality of feature points extracted (S232), calculates coordinates of corresponding points of feature points other than the partial feature points, and determines residuals of the coordinates of the feature points on a basis of the coordinates (S233). Constituting in this way permits to easily estimate transformation characteristic between images. Besides, as large errors are removed with a simple process before each estimation calculation process, calculation converges quickly and results are obtained with high accuracy.

In Aspect (4) of the invention, based on the aspects (1) to (3), the projection parameters in the first track determining section are affine transformation parameters. Constituting in this way permits to easily cope with coordinate transformation for both translation and rotation of coordinates.

In Aspect (5) of the invention, based on the aspect (3) or (4), as shown in FIG. 3B, for example, the robust estimation employed in the first track determining section (S234-S235) is LMedS method: to determine a median of magnitudes of difference in the coordinates for each corresponding point on a basis of the set of projection parameters determined from the partial corresponding points (S234), in which a same process is applied to combinations of other partial corresponding points, to choose a combination of the partial corresponding points that minimizes the determined median; and to determine the projection parameters (S236). Constituting in this way makes it possible to eliminate large errors with a simple process before each estimation calculation process, so that calculation converges quickly and gives results with high accuracy. Here, the differences in the coordinate values may be of any magnitude as long as its sign is positive. Therefore, squares of the coordinate values may be used.

In Aspect (6) of the invention, based on the aspects (1) to (5), as shown in FIG. 1 for example, the invention is provided with a GPS location data acquiring section 12 for acquiring photographing location data from GPS data and an operating section 1 for determining correlation between the photographing location data acquired and the photographing location data of respective frame determined in the location measuring section 7. Constituting in this way permits to ensure appropriateness of measured results and improve reliability of measured results.

Aspect (7) of the invention relates to a method corresponding to the aspect (1). As show in FIGS. 1 and mainly 3A for example, the method in the aspect (7) of the invention includes: a feature point extracting step (S21) of extracting a plurality of feature points on a photographing object from each of successively photographed images in a plurality of frames obtained with an image obtaining means 2, a location of the image obtaining means relatively varying to a location of the photographing object with time; a feature point tracking step (S22) of searching each of the successively photographed images for points corresponding to the feature points and tracking the feature points; a first track determination step (S23) of applying robust estimation to residuals, each of the residuals being a residual of a coordinate calculated by using the projection parameters between one and another images on a basis of locational relationship between the feature points on the one and another images from a process of the tracking or results of the tracking in the feature point tracking step (S22) and determining an estimated value of the projection parameters; a second track determining step (S24) of determining a residual between a coordinate of the corresponding point corresponding to each of the feature points and an estimated coordinate of the corresponding point by utilizing the estimated value of the projection parameters determined in the first track determining step (S23), applying a threshold process, determining whether or not the each of feature points is incorrect corresponding point, and removing the incorrect corresponding point from the feature points; a template re-matching step (S25) of determining an estimated coordinate of the corresponding point by utilizing the estimated value of the projection parameters determined in the first track determination step (S23), and carrying out template matching in a vicinity of the estimated coordinate to determine a coordinate of each of appropriate corresponding points; and a location measuring step 7 of measuring a coordinate of the photographing object, or the location or a photographing posture of the image obtaining means 2 on a basis of coordinates of the corresponding points other than the incorrect corresponding points determined in the second track determining step and on a basis of the coordinates of the appropriate corresponding points determined in the template re-matching step (S25).

Constituting in this way, as large errors are removed before each estimation calculation process, calculation converges quickly and gives results with high accuracy.

To solve the above problems, a location measuring device in the aspect (8) of the invention comprises as shown in FIG. 1 for example: a feature point extracting section 3 for extracting a plurality of feature points on a photographing object from each of successively photographed images in a plurality of frames obtained with an image obtaining means 2, a location of the image obtaining means relatively varying to a location of the photographing object with time; a feature point tracking section 4A for searching each of the successively photographed images for points corresponding to the feature points and tracking the feature points; a first relative orientation process section 5A for choosing one photographed image frame and another photographed image frame from tracked results of the feature point tracking section 4A, carrying out relative orientation based on a plurality of points randomly chosen out of the respective corresponding points between the two photographed image frames, determining vertical parallaxes, applying robust estimation to the determined vertical parallaxes, and determining estimated values of parameters for the relative orientation while reducing influence of errors; a second relative orientation process section 5B for carrying out relative orientation between the respective corresponding points of the two image frames based on the parameters for the relative orientation estimated in the first relative orientation process section 5A, calculating vertical parallaxes of the feature points, applying threshold process to the vertical parallaxes, and excluding incorrect corresponding points or determining appropriateness of the photographed image frames; and a location measuring section 7 for measuring a coordinate of the photographing object, or the location or a photographing posture of the image obtaining means 2 using the plurality of photographed image frames.

Here, the robust estimation is a method that may be carried out relatively easily even when observation data include those having large errors. Methods belonging to this type are for example: LMedS method, median estimation (M estimation) method, and RANSAC method. The threshold process is to compare data with a predetermined threshold and eliminate or choose data depending on their relative magnitudes. With the above arrangement, as large errors are eliminated before each estimating calculation process, calculation converges quickly and gives results of high accuracy.

In Aspect (9) of the invention, based on the aspect (8), for example as shown in FIG. 1, the device comprises a GPS location data acquiring section 12 to obtain location data of the image obtaining means from the GPS data, and choose a stereo pair having a sufficient baseline length from acquired location data. Constituting in this way, in comparison with that in which stereo pairs are simply chosen at random, makes it possible to accurately choose appropriate stereo pairs and shorten the convergence time of calculated results.

A location measuring device in the aspect (10) of the invention includes as shown in FIG. 1, for example, a feature point extracting section 3 for extracting a plurality of feature points on a photographing object from each of successively photographed images in a plurality of image frames obtained with an image obtaining means, a location of the image obtaining means relatively varying to a location of the photographing object with time; a feature point tracking section 4A for searching each of the successively photographed images for points corresponding to the feature points and tracking the feature points; a bundle adjustment process section 6A for choosing a plurality of image frames from results of the tracking by the feature point tracking section, applying bundle adjustment process to coordinate locations of the feature points between the plurality of image frames or to photographing locations of the respective frames, and applying robust estimation to coordinate location data of the feature points determined by the bundle adjustment process or to residuals of the photographing locations of the respective frames to determine estimated data of the coordinate location or the residuals; a choice-removal process section 6B for, based on the estimated data determined in the bundle adjustment process section, determining threshold, and removing incorrect corresponding points or choosing image frames according to the threshold; and a location measuring section 7 for measuring coordinates of the photographing object, or the location or a photographing posture of the image obtaining means by using the bundle adjustment results obtained using the feature points and the image frames determined to be appropriate.

With the above constitution, as the feature points and frames are evaluated on the basis of a plurality of frame images, it is possible to remove inappropriate feature points and frames before the final bundle adjustment. Besides, as large errors are removed before respective estimating processes, calculation converges quickly and provides results with high accuracy.

In Aspect (11) of the invention, based on the aspect (10) of the invention, the device includes as shown in FIG. 1, for example, a GPS location data taking section 12 for acquiring the location data of the image obtaining means from GPS data is provided to choose the photographed image frames from the location data. The above constitution, in comparison with the constitution in which stereo pairs are chosen simply at random, makes it possible to accurately choose the taking location, make initial conditions close to the estimated values, and shorten the convergence time of the measured results.

In Aspect (12) of the invention, based on the aspects (8) to (11) of the invention, the robust estimation is one of LMedS method, median estimation (M estimation) method, and RANSAC method. The above constitution makes it possible to remove large errors in a simple process before each estimating calculation process, so that calculation converges quickly and provides results with high accuracy.

Aspect (13) of the invention is a method corresponding to the aspect (8). For example as shown in FIG. 1 and mainly in FIG. 4, the method includes: a feature point extracting step 3 of extracting a plurality of feature points on a photographing object from each of successively photographed images in a plurality of image frames obtained with an image obtaining means, a location of the image obtaining means 2 relatively varying to a location of the photographing object with time; a feature point tracking step 4A of searching each of the successively photographed images for points corresponding to the feature points and tracking the feature points; a first relative orientation process step (S42) of choosing a stereo pair of one photographed image frame and another photographed image frame from results of the tracking by the feature point tracking section 4A (S421), carrying out relative orientation based on a plurality of points randomly chosen out of the respective corresponding points between the two photographed image frames (S423), determining vertical parallaxes, applying robust estimation to the determined parallaxes, and determining estimated values of parameters for the relative orientation while reducing influence of errors (S424), (S425); a second relative orientation process step (S43-S44) of carrying out relative orientation (S430,S441) between the respective corresponding points of the two image frames based on the parameters for the relative orientation estimated in the first relative orientation process step (S42), calculating vertical parallaxes of the feature points, applying threshold process to the vertical parallaxes (S432,s443), and excluding incorrect corresponding points or determining appropriateness of the photographed image frames; and a location measuring step (S45) of measuring a coordinate of the photographing object, or the location or a photographing posture of the image obtaining means using the plurality of photographed image frames.

With the above constitution, as large errors are removed before each estimating calculation step, makes calculation converge quickly and results are provided with high accuracy.

Aspect (14) of the invention is a method corresponding to the aspect (10). For example as shown in FIG. 1 and mainly in FIG. 6, the method includes: a feature point extracting step 3 of extracting a plurality of feature points on a photographing object from each of successively photographed images in a plurality of frames obtained with an image obtaining means 2, a location of the image obtaining means relatively varying to a location of the photographing object with time; a feature point tracking step 4A of searching each of the successively photographed images for points corresponding to the feature points and tracking the feature points; a first bundle adjustment process step (S67) of choosing a plurality of image frames from results of the tracking by the feature point tracking section (S671), applying bundle adjustment process to coordinate locations of the feature points between the plurality of image frames or to photographing locations of the respective frames (S674), and applying robust estimation to the coordinate location data of determined feature points or to the residuals of the photographing locations of the respective frames (S675,S676) to determine estimated data of the coordinate location or the residuals; a choice-removal process step (S68) of, based on the estimated data determined in the bundle adjustment process step (S67), determining threshold, and removing incorrect corresponding points or choosing image frames according to the threshold; and a location measuring step (S69) of measuring coordinates of the photographing object, or the location or a photographing posture of the image obtaining means 2 by using the bundle adjustment results obtained using the feature points and the image frames determined to be appropriate.

With the above constitution, as the feature points and frames are evaluated based on a plurality of frame images, inappropriate feature points and frames may be removed before the final bundle adjustment. Besides, as large errors are removed before the respective estimating calculation processes, calculation converges quickly and provides results with high accuracy.

The basic Japanese Patent Application No. 2007-179036 and No. 2007-179037 filed on Jul. 2, 2007 are hereby incorporated in its entirety by reference into the present application. The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not literally fall within the scope of the present claims constitute, therefore, a part of the present invention in the sense of doctrine of equivalents.

BRIEF DESCRIPTION OF THE DRAWINGS

FIG. 3C shows the details of the second track determining section (step) of FIG. 3A.

DETAILED DESCRIPTION OF THE PREFERRED EMBODIMENT

An embodiment of the invention will be hereinafter described in reference to the drawings.

First Embodiment

Figure 9:
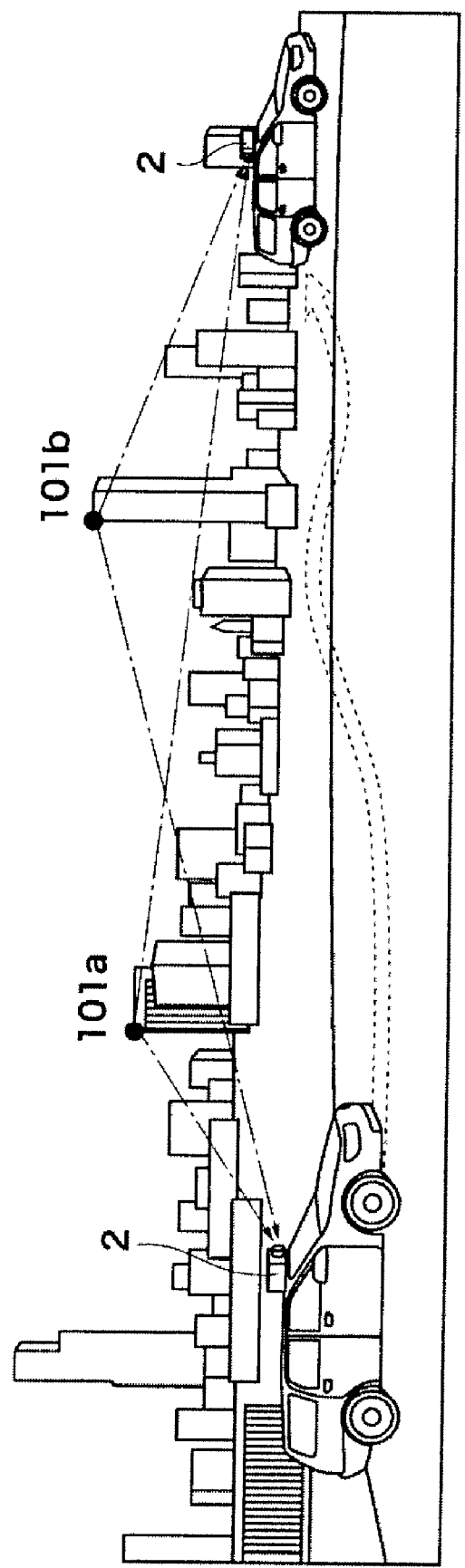
FIG. 9 shows the concept of the invention.

FIG. 9 shows the concept of this embodiment. This is an example in which a camera 2 is mounted on a vehicle to photograph images of an urban area as the vehicle gradually changes its location. From the results of tracking noticeable marks (feature points 101a, 101b; for example specifically noticeable points on a building) in a plurality of shot images, the location of the camera 2 or the trajectory of the vehicle is determined. While this makes it possible to display successively the locational coordinates of the camera 2 or the location of the vehicle on a vehicle navigation apparatus, supplemental use is also meaningful in areas where GPS radio waves are unavailable. When the camera 2 (hereinafter may be occasionally called the image obtaining section 2) is mounted on the vehicle as shown in the figure, the photographed image moves in various directions; lateral, vertical, and rotary directions. The photographed image often contains moving objects such as other vehicles, humans, and others. All of these are primary error factors.

[Constitution of Hardware and Software Module]

Figure 1:
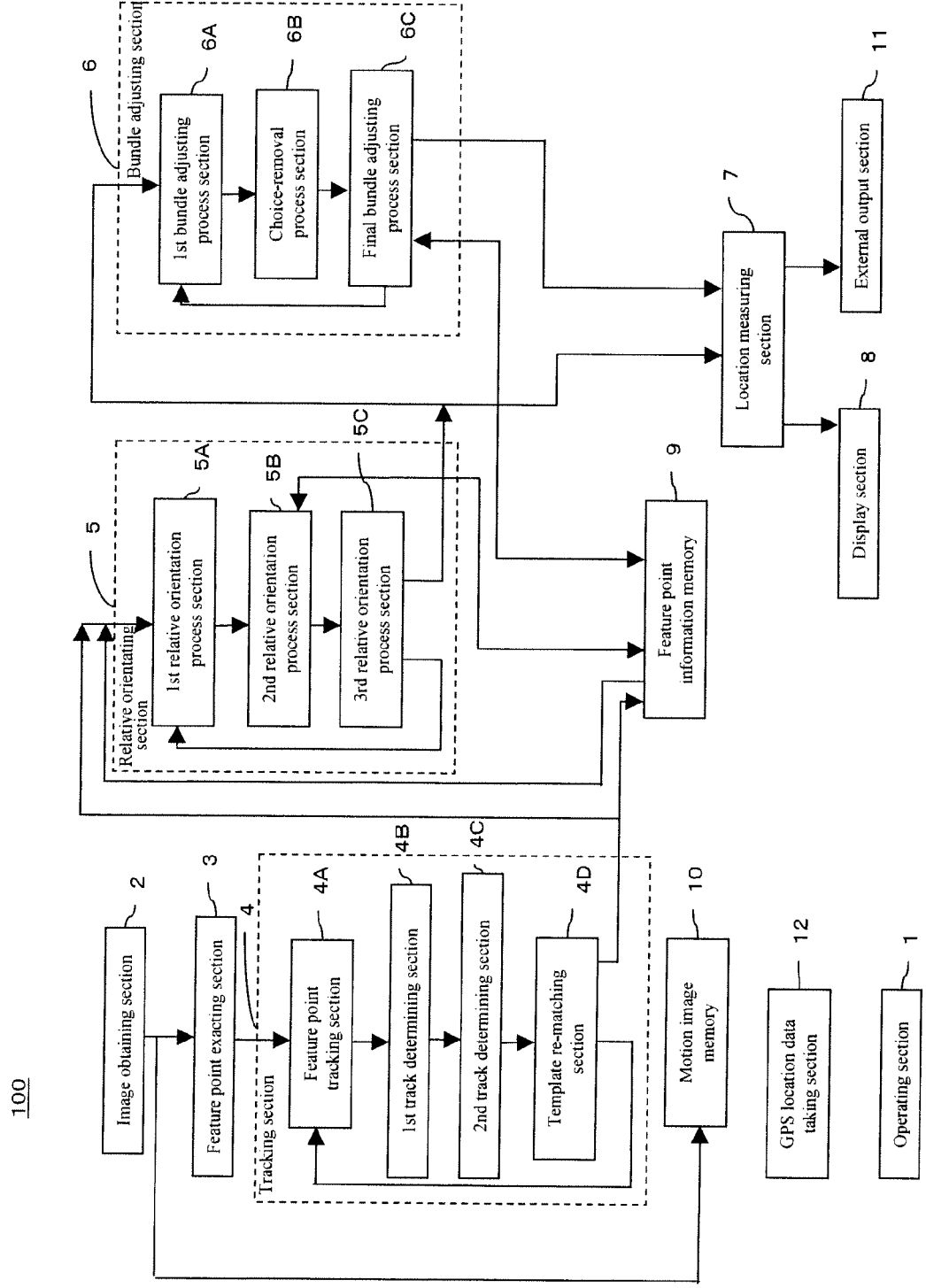
FIG. 1 shows the constitution of hardware and software of the invention.

FIG. 1 shows a constitution example of a location measuring device 100 of this embodiment. FIG. 1 schematically shows hardware, and a software module mounted on the hardware. In the figure, an operating section 1 is a part that controls various parts of the location measuring device 100 so that they function as the location measuring device. Specifically the operating section 1 has such functions as: to instruct the image obtaining section 2 to start or stop photographing images, to change the setting of the feature extracting section 3; to change the setting of, and start or stop operation of the tracking section 4; to instruct the relative orientation section 5 and the bundle adjusting section 6 to start processing and to implement orientation. The image obtaining section 2 is to successively acquire images such as motion images, and is typically a video camera. Besides acquiring shot images, it also functions to give output to the feature extracting section 3 and to store shot images in the motion image memory 10. Incidentally, the stored data may contain all frames or skipped frames. Further, the location measuring device 100 may dispense with the image obtaining section 2 so as to acquire shot images from an external image obtaining device through cabled or wireless communication means.

The feature point extracting section 3 is to extract feature points out of images successively photographed and varying slightly from one image to the next. Feature points are extracted from the images inputted from the image obtaining section 2. Information on the shade of image around each feature point obtained is outputted to both the tracking section 4 and the relative orientation section 5. The tracking section 4, using shade information on feature points inputted from the feature point extracting section 3, searches other frame images for a point (feature point) with its surroundings having approximately the same shade information to keep track of the feature point. Besides this tracking, the tracking section 4 also functions to output results of tracking to the relative orientation section 5, to instruct to start implementation, to determine placing of candidate corresponding points, and to instruct the feature point extracting section 3 to set new feature points.

In the description below, the "feature point" means the point obtained from the feature point extracting section, and the "corresponding point" means relatively corresponding feature points in two or more image frames in which imaged objects are confirmed to be identical.

In FIG. 1, processes in the image obtaining section 2, the feature point extracting section 3, and the tracking section 4 are typically carried out in real time when image data are inputted and, will be described below. Processes in the relative orientation section 5 and the bundle adjusting section 6 are typically carried out in non-real time; data on a plurality of images obtained with the feature extracting section 3 and the tracking section 4 are stored in a memory and then processed. However, it is possible as a matter of course to make the tracking process in non-real time, and make the processes in the relative orientation section 5 and the bundle adjusting section 6 in real time.

Information on the feature points to be the reference of the above processes is stored in the feature point information memory 9. This memory is adapted that the information on the coordinate values of each frame and correlation with feature points (corresponding points) of other frames may be written and/or erased at any time during processes. Reference numeral 10 denotes a motion image memory for storing shot images. A location measuring section 7 is to output final, three-dimensional data as coordinate values of processed feature points (or corresponding points) and exterior orientation parameters. The results are outputted to a display section 8 and an external output section 11.

The display section 8 stereoscopically displays for example images of an object measured in three dimensions.

[Whole Flow]

Figure 2:
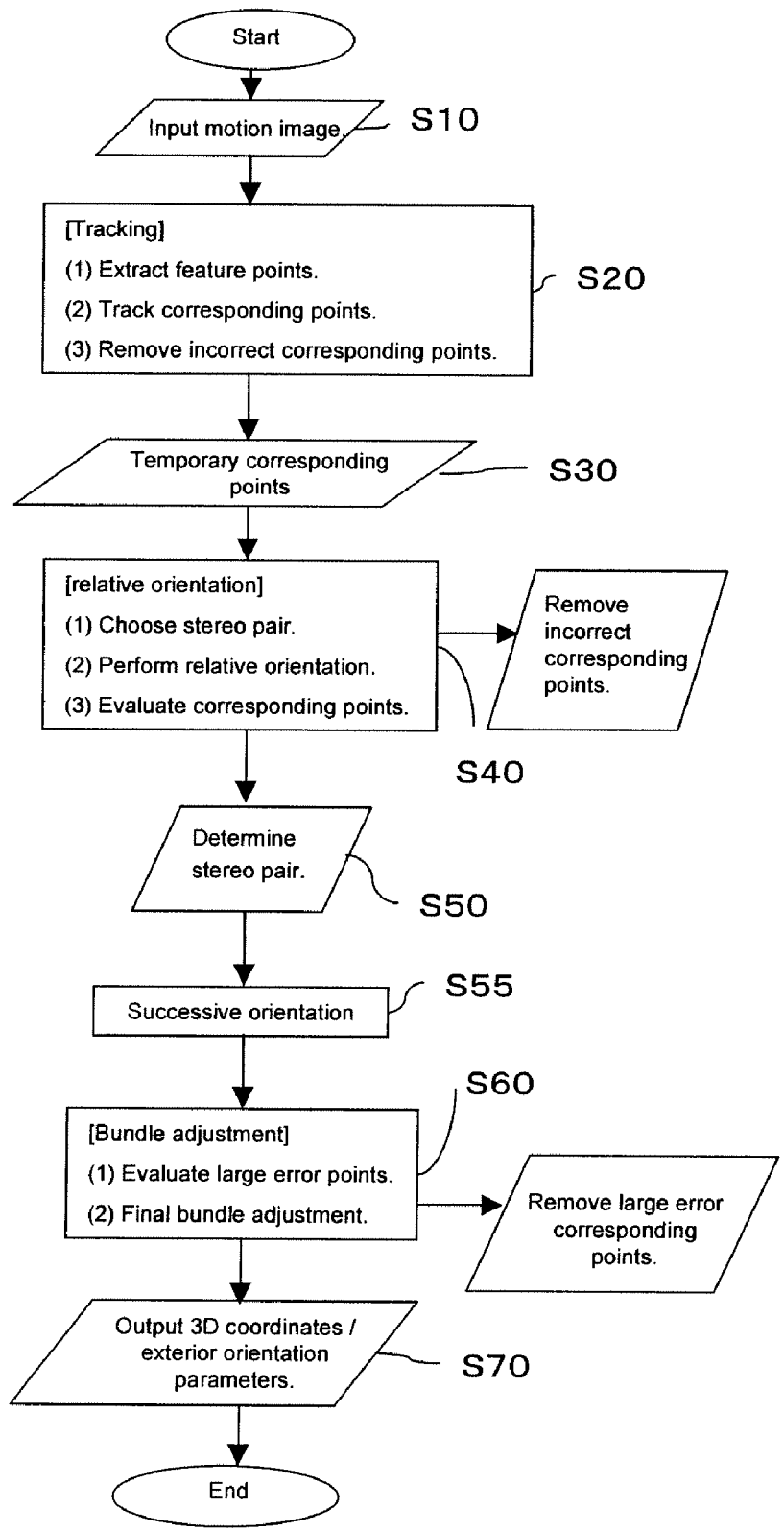
FIG. 2 shows a whole flow diagram of image processing method as a first embodiment.

FIG. 2 shows an example of whole flow of the image processing method as the first embodiment. Detailed processes in various parts will be described later. First, shot motion image data are successively imported (S10). These are a succession of frame images. Next, a tracking process is carried out (S20). That is, a feature point is extracted from one of the motion frame images imported, and shade pattern of the feature point including its vicinity is stored. Here, using the pattern of the feature point in this frame image as a template, another frame image is searched for part having a similar pattern to determine a corresponding point. Next, a plurality of corresponding points determined in this way are assessed whether or not they are appropriate corresponding points. Incorrect corresponding points are excluded from the feature point information memory 9 or information on that effect is written (hereinafter simply referred to as exclusion, etc.). The process in the step S20 is typically carried out in real time. Inputted frames are successively processed. Corresponding points are stored every time they are processed. The feature point information memory 9 is rewritten with the results of assessment of corresponding points whether or not they are incorrect. Incidentally as a matter of course, inputted frames may be thinned out before they are processed. As described above, (temporary) corresponding points to be reference points for measurement are determined (S30). The word "temporary" above is used because the corresponding points may be excluded depending on the result of re-assessment for appropriateness in a later process (relative orientation, bundle adjustment, etc.).

Next in the step S40, relative orientation is made to match respective coordinate axes between corresponding points of two image data. That is, a stereo pair appropriate for the relative orientation is chosen. Based on the corresponding points determined in the step S30, coordinate axes of images are adjusted to satisfy for example coplanar conditions between them so that three-dimensional image is obtained. In the case any corresponding points prove to be inappropriate in the step of relative orientation, the feature point information memory is rewritten to erase inappropriate data. As a result, stereo pairs appropriate for determining three-dimensional coordinates, such as having sufficient baseline length, are determined (S50).

Next, successive orientation is carried out to obtain continuous model images (S55). This step is to equalize tilt and reduction scale between models to produce an identical coordinate system. Using tie points and pass points present on images, bundle adjustment process is carried out to obtain successive model images for simultaneously determining exterior orientation parameters of each image by least squares method (S60). Also here, corresponding points that prove to give large errors in the middle of the step are excluded, followed by bundle adjustment to determine exterior orientation parameters such as location coordinates, posture, etc. and three-dimensional coordinates of the image obtaining section 2 (S70). Details of each step will be described below.

[Tracking]

Figure 3A:
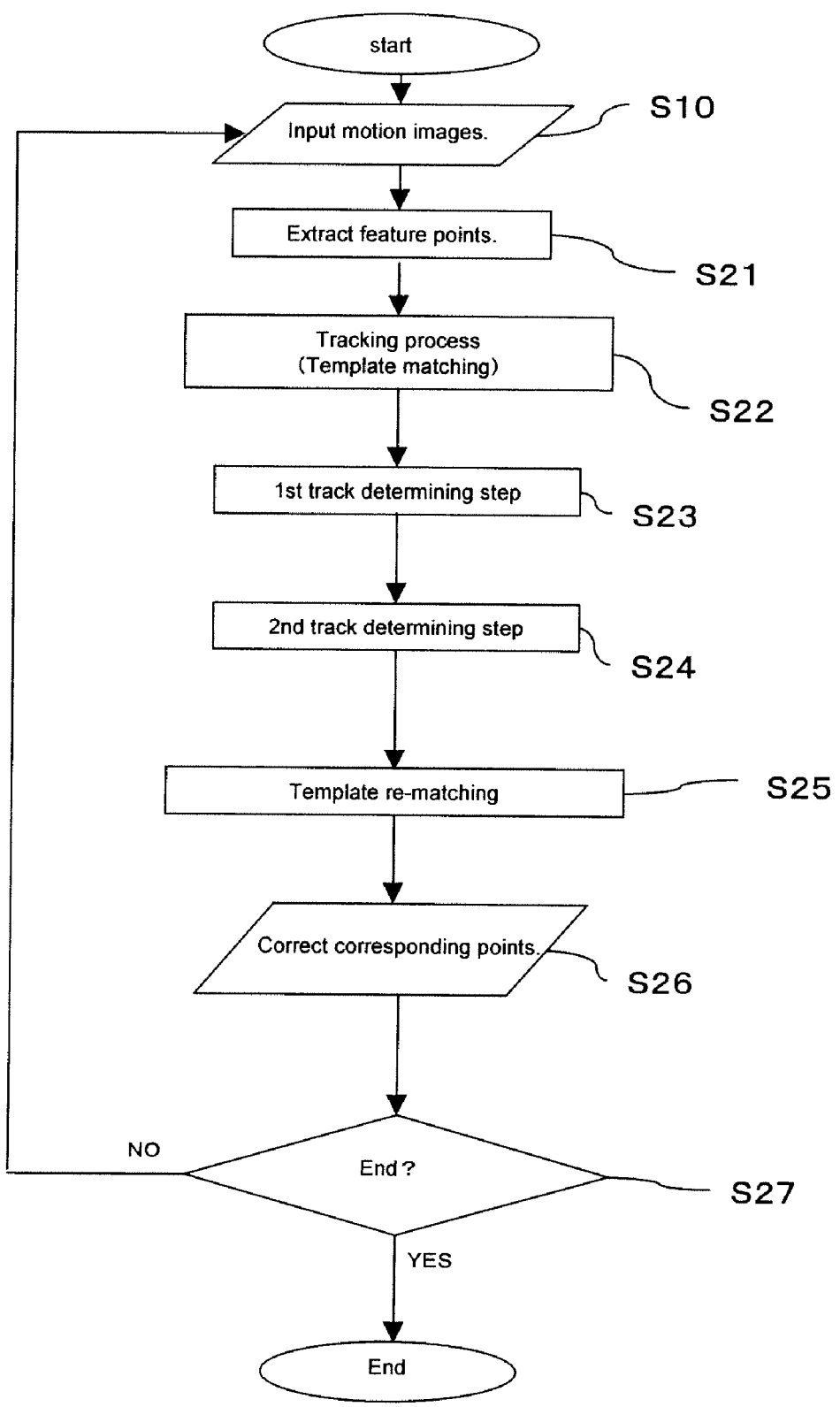
FIG. 3A shows the contents of processing with the track processing section.

FIG. 3A shows the contents of processing with the tracking section 4. The process contents will be described in reference to FIGS. 1 and 3A. As shown in FIG. 1, first, the image obtaining section 2 acquires a shot image. The image to be acquired may be either photographed with the image photographed section 2's own image obtaining apparatus or obtained with other pickup apparatus to be acquired through communication lines, a memory, a tape, etc. Next, gradually varying photographed images are successively supplied to the feature point extracting section 3. In this embodiment, as images are photographed with the vehicle-mounted camera 2 while the vehicle is moving, the gradually varying images vary with time and space. Therefore, most of adjacent frames (or frames thinned out by a certain number) commonly contain the same objects. Incidentally, the camera 2, may be carried not only by mounting on the vehicle but also by a walking person, or mounting on a bicycle, to photograph images.

[Extracting Feature Points]

Feature point extraction (S21 in FIG. 3A) is carried out in the feature point extracting section 3. Typically, extraction with the initial frame is made from a full-screen image. From the second frame, extraction is made from a new image region not overlapping with the first frame. Alternatively, feature point extraction may be made at certain time intervals: For example, feature points are extracted and new feature points are produced every time the number of feature points of a template decreases by about 30 to 50 percent, and tracking is carried out while renewing the template. In other words, it is not always necessary to produce feature points every time. For the feature point extraction, such operators may be appropriately employed as: MORAVEC operator (H. P. Moravec. Towards Automatic Visual Obstacle Avoidance. Proc. $5^{th}$ International Joint Conference on Artificial Intelligence, pp. 584, 1977), operators of Harris, Pressy, and Susan.

Whichever feature point extracting operator may be used, there is a problem that it is likely to react to very small noise on the image (such as a noise on the edge). To improve this characteristics, image noise removal step is taken using a noise filter such as an average value filter before using a feature point extracting operator.

Besides, depending on the imaged object, there are cases in which many feature points are located in a certain part (such as trees and grass) of an image. This results in evaluating the whole from a part of the image and may adversely affect template matching which will be described later. To avoid this, point selection step is taken. Further, in the case the maximum number of feature points is specified in advance, it is adapted to locate them evenly over the whole image, so that steps thereafter such as relative orientation are taken securely. As described above, while the feature point extraction is implemented through various steps, they are not directly related to this application and so further explanation is omitted.

[Tracking Corresponding Points]

Explanation will be continued in reference to FIG. 3A. A tracking step (S22) is carried out in the feature point tracking section 4A to track points corresponding to the feature points, chosen in the step of feature point extracting, from frame to frame. In other words, this is a step in which another image is searched for candidate points corresponding to the feature points. Specifically, an adjacent image is searched for a part having an image pattern similar to the shade pattern around the feature point (template matching) to determine a candidate point corresponding to one feature point. For the template matching, a method such as SSDA (sequential similarity detection algorithm) may be used. The SSDA is a method in which difference in shade of a corresponding point is used to determine the degree of similarity of patterns: A point in a compared area (template size) of least difference in shade is determined to be a candidate corresponding point. For the template matching, other methods such as the normalized correlation method may be used (Refer to for example; Minoru Akiyama, *SHASHIN-SOKURYO* (*Photographic Surveying*), Tokyo, Sankaido, pp. 234-235). For the template matching, it is important to make optimum selection of template size and search area. As for the search area, it should be set optimum according to the frame plate of the camera 2 and the moving speed.

While it is possible with the template matching to determine candidate points corresponding to feature points, mismatching also occurs often. For example, incorrect corresponding points can occur due to mismatching when feature points are given to moving objects such as running vehicles, flying birds, and falling leaves, or the camera is vibrated hard while image is photographed. These incorrect corresponding points should be excluded as much as possible because they cause errors later in relative orientation and bundle adjustment, leading to increase in process time.

The steps S23 to S25 are to extract incorrect corresponding points out of the determined corresponding points and exclude them out of the corresponding feature points. They include: a step of first track determination S23, a step of second track determination S24, and a step of template re-matching S25. The first track determining section (S23) is to estimate the coordinate transforming projection parameters (hereinafter simply called the "projection parameters") between images from the motion of the whole image obtained from the tracking results Details will be described in reference to FIG. 3B. The step of second track determination (S24) is to receive and process the results of the step S23. Based on the projections estimated in the step of first track determination, corresponding points are evaluated and incorrect corresponding points are excluded from the feature point information memory 9. Details will be described in reference to FIG. 3C. The step of template re-matching (S25) is to apply template re-matching to the corresponding points in which incorrect corresponding points are excluded. The results are used to re-evaluate the corresponding points so as to further exclude inappropriate corresponding points (S26). Details will be described in reference to FIG. 3D.

In the step S27, when the above steps are repeated and correction of corresponding points are over for more than a specific number of frames, the corresponding points are outputted as temporary corresponding points to the next step S30. The number of frames here is appropriately determined in response to processing capacity and speed of the system.

Figure 3B:
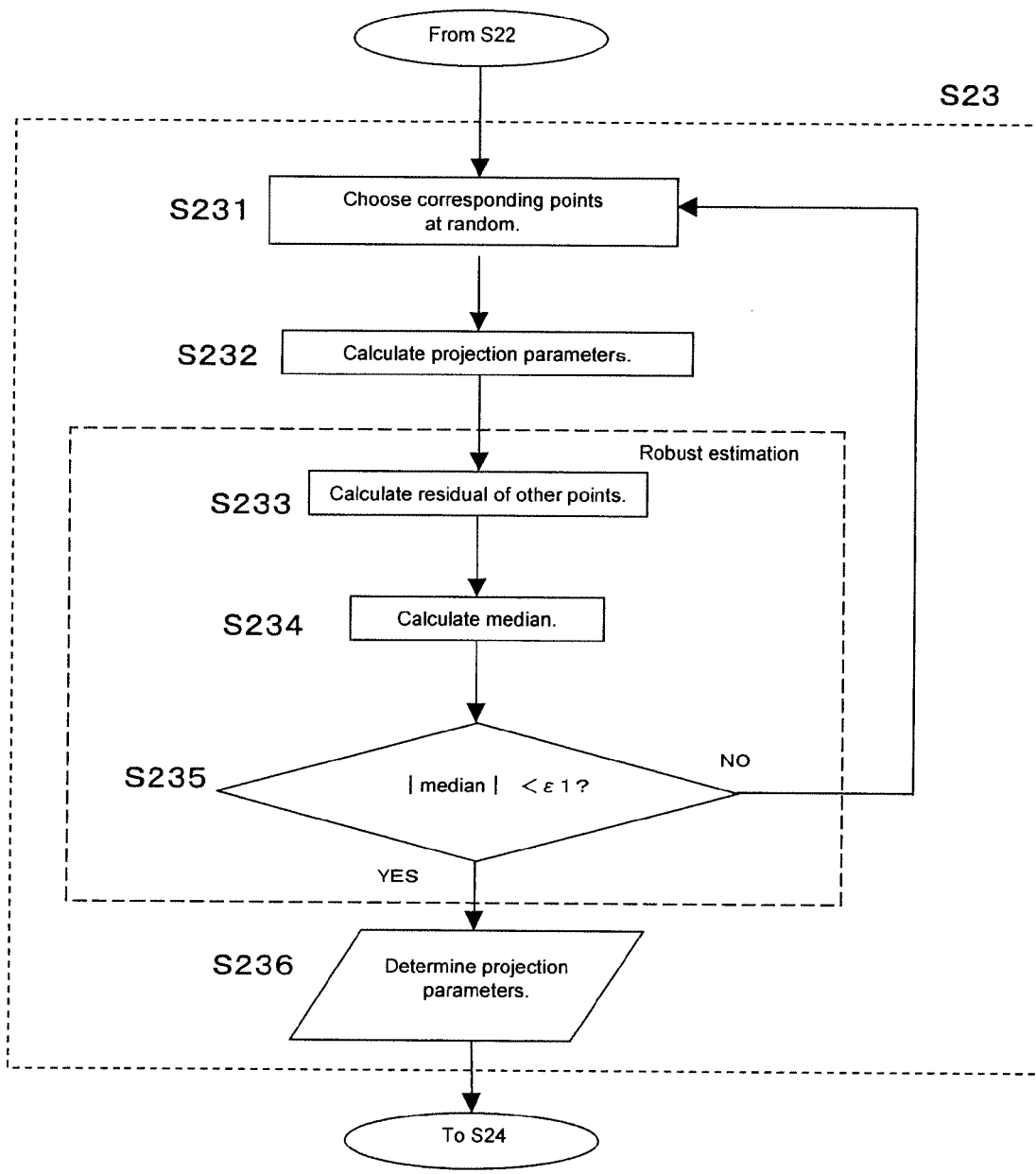
FIG. 3B shows the details of the first track determining section (step) of FIG. 3A.

FIG. 3B shows the contents of the step of first track determination. First, typical step contents are described, followed by description of specific examples. This step relates to two frames; one shot image frame (called frame A) and another shot image frame (called frame B). First, of the candidate corresponding points determined by the template matching in the step S22, a plurality of sets of points are chosen at random. The number of sets should be greater than the number of projection parameters in the next step (S232). To reduce errors, the candidate corresponding points are preferably chosen from not a localized part but the whole area of the frame. Next, matrix elements (parameters) for projection transformation between frames A and B are to be determined. While there are various methods of projection transformation, the affine transformation and the Helmert transformation are commonly used. Here, an example of the affine transformation will be described, which is relatively easy to handle both translational transformation and rotary transformation.

Assuming the coordinate values of corresponding frames to be (x', y'), (x", y"), the affine transformation is expressed with six projection parameters as shown below.

$$x' = ax'' + by'' + c \quad (1a)$$

$$y' = dx'' + ey'' + f \quad (1b)$$

The six projection parameters (a)-(f) above are determined from the coordinates of six or more sets of corresponding points chosen. Using these parameters and the equations (1a) (1b), of the above sets of corresponding points chosen, those on one side are fixed and coordinate values on the other side (estimated coordinates) are determined. As for each of the corresponding points, the residual of coordinate between the estimated coordinate and the actual coordinate is determined (S233). This residual may also be defined for example to be the difference in distance between two coordinate points on x-axis and y-axis. If all the corresponding points are recognized correctly, this residual should be very small. Among the six or more sets of corresponding points chosen as described above, there are incorrect corresponding points and those with errors that are large but not so large as to be called incorrect corresponding points. When such corresponding points are chosen, correct projection parameters cannot be determined. Therefore, chosen corresponding points are evaluated using the residuals. This embodiment is described as one using a median (medium value) of residuals. The median, as is well-known, is a data value located in the middle when a plurality of data are put in the order of magnitude. In the case with five data for example, the median is the value of the third data. General tendency of a population may be grasped with the median. The median is advantageous because it can be simply obtained by putting data in the order of magnitude as mathematical operation and is less affected with data having large residuals because observation data having a large variance are neglected. In this embodiment, the magnitude of the median is determined from the residuals of the respective corresponding points (S234) and whether this value is a specified one (ϵ1) is determined. Incidentally, square of the median may also be used as the value of the median. When the median is greater than the specified threshold (ϵ1), it means that the corresponding point chosen is inappropriate. Then, the process goes back to the step S231 to choose a new corresponding point. The same operation is applied to the new corresponding point. If the median falls within the specified threshold (ϵ1), a set of projection parameter of that time is determined (S236). The threshold at this time is set for example to one pixel (picture element).

While this embodiment is described as using an algorithm in which the median or its square becomes a minimum (LMedS method), the embodiment is not limited to the above. The same effect is obtained with the so-called robust estimation method less affected with errors (for example RANSAC method, and median estimation method or M estimation method). As such methods are well known, their explanation is omitted here.

FIG. 3C shows the contents of the second track determining section. From the projection parameters determined in the above step S23 (See FIG. 3B), points in the frame B corresponding to the feature points in the frame A are calculated as predicted points. For all the corresponding points, a residual between each corresponding point and the coordinate value in the frame B is determined. Next, a threshold step is carried out in which each corresponding point is compared with a point having a residual greater than the predetermined threshold (S243). Those differing by more than the threshold are excluded as incorrect corresponding points (S244).

Figure 3D:
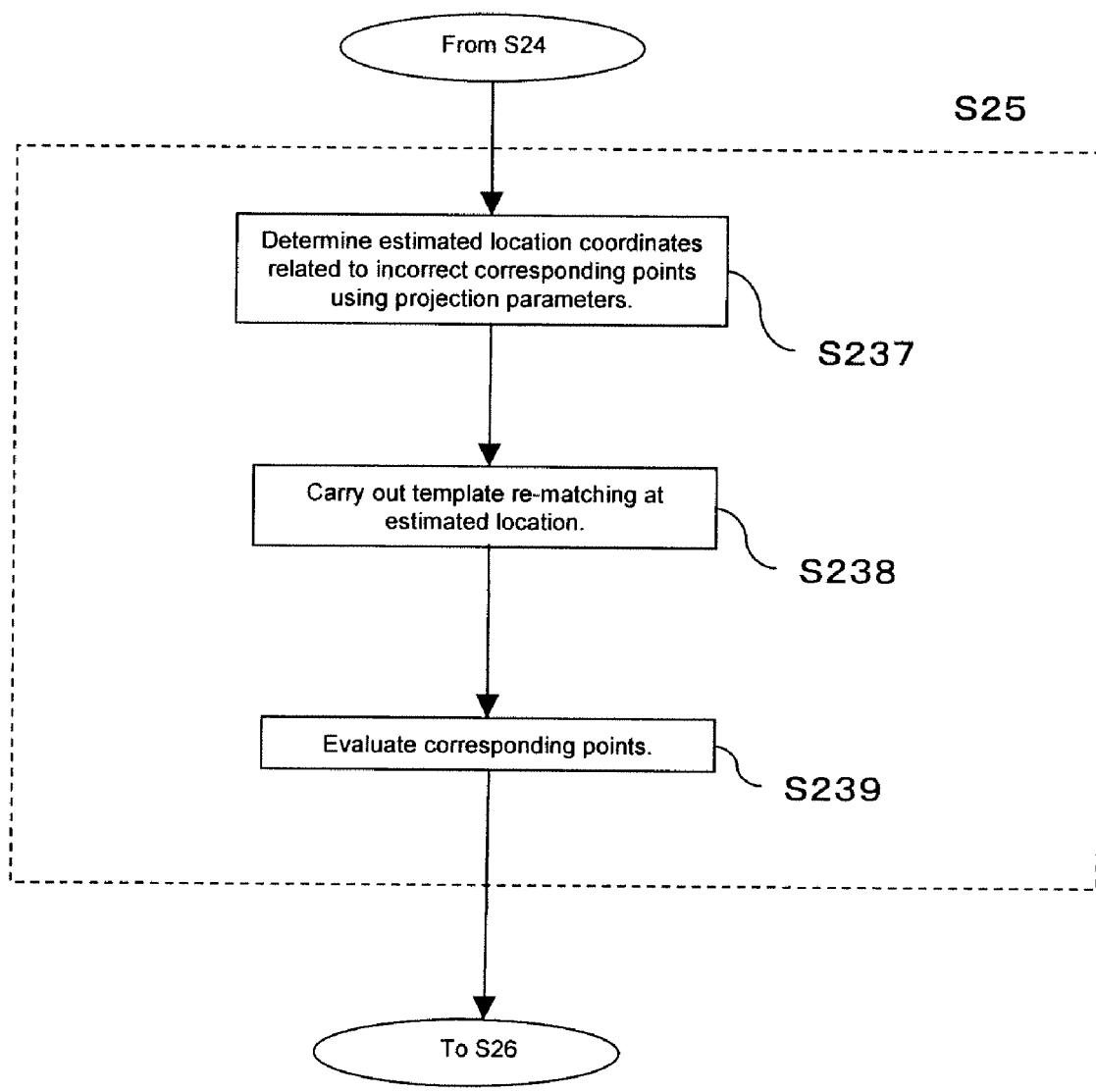
FIG. 3D shows the details of the template re-matching section (step) of FIG. 3A.

FIG. 3D shows the contents of the step S25, the step of template re-matching. Using the projection parameters determined in the first track determining section, estimated coordinate of each corresponding point is determined for the points determined to be incorrect (S237). In the vicinity of this coordinate point, the template re-matching is carried out (S238). In the case that a corresponding point within a specified distance from the estimated coordinate is found out as a result, this point is assumed to be a corresponding point and added to the feature point information memory 9. In the case that matching occurs at a point distant by more than the specified distance, or in the case that no matching point is found out, the corresponding point is excluded as an inappropriate corresponding point and excluded from the feature point information memory 9. However, when the corresponding point information is not present in the feature point information memory 9, it is left intact. As described above, the corresponding points not excluded in the step of second track determination and the corresponding points newly determined in the step of template re-matching (S25) are put together to be new corresponding points.

While the tracking process above is described as an example to process the photographed images in real time, it is also possible as a matter of course to store photographed images in a memory or the like and process the image data after taking, not in real time. It is also possible to process the photographed images not for all the frames but for appropriately thinned-out frames. Which frames are to be thinned-out may be adaptively determined depending on the moving speed of the image obtaining apparatus and location data supplied from other means.

[Removing Incorrect Corresponding Points by Relative Orientation and Choosing Stereo Pairs Using Robust Estimation]

Figure 4:
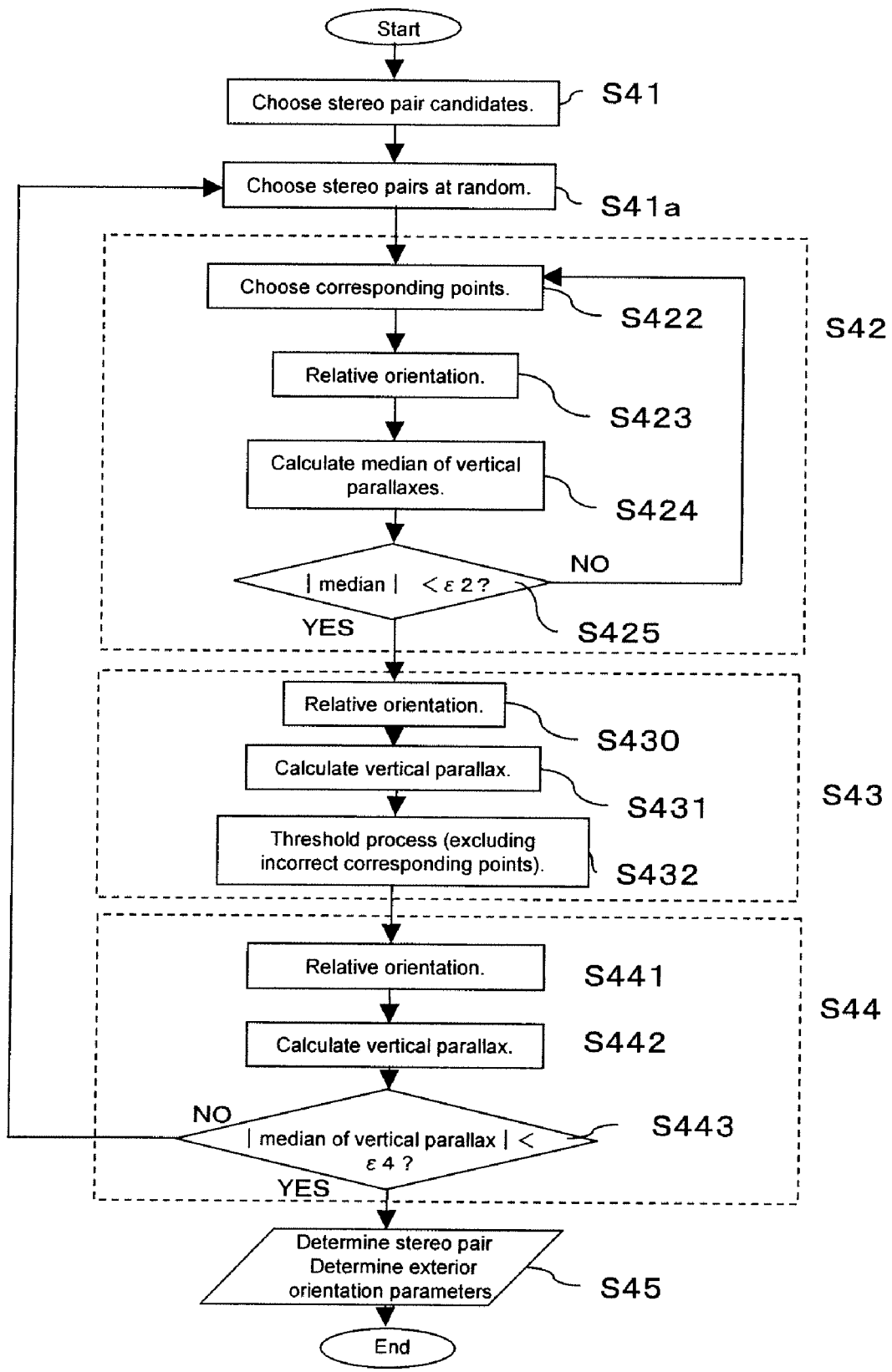
FIG. 4 shows the details of the relative orientation section (step).

FIG. 4 shows details of the process. This process carries out relative orientation using the robust estimation to remove incorrect corresponding points and further determine appropriate frame pairs (stereo pairs) having different parallaxes that can be used in three-dimensional measurement, using the corresponding points determined in the tracking process as input data. First, a plurality of stereo pairs that can provide a certain length of baselines are chosen (S41). For example, a feature point observed on a certain frame is examined for its location on a later, another frame. In the case that a sufficient amount of displacement is found, or the location is displaced toward one side of an image frame, a plurality of such frames are chosen as stereo pair candidates. The number of frames and the speed or the trace of point being tracked are utilized to choose these pairs.

Next, in the first relative orientation section (S42), stereo pairs are chosen at random from the stereo pair candidates. Relative orientation is carried out using some of the plurality of points of respective corresponding points between two photographed image frames. Vertical parallax is determined. A robust estimation is applied to the determined parallax. Influence of large errors is minimized and estimated value of relative orientation parameters are determined.

Incorrect corresponding points are removed as follows: In the second relative orientation section (S43), relative orientation is carried out again on the basis of relative orientation parameters (exterior orientation parameters) estimated in the first relative orientation section. Vertical parallax of the feature point is calculated again. Threshold processing is applied to the parallax. A stereo pair that suffices to provide a stereo view is chosen. Corresponding points in the stereo pairs chosen in the second relative orientation process section are evaluated. Points not appropriate for corresponding points are excluded (S43). Next, in the step S44, relative orientation is carried out using corresponding points other than incorrect ones (details will be described later). A chosen stereo pair is re-evaluated. When appropriate, the pair is employed as a stereo pair. When inappropriate, the process goes back to the first relative orientation section (S42) to choose another stereo pair and carry out the same process. In this way, an appropriate relative orientation parameter values are estimated in the first relative orientation section. An inappropriate stereo pair is excluded. Incorrect corresponding points are excluded in the second relative orientation section. In later calculation (S44), an inappropriate stereo pair is excluded. Carrying out selection of appropriate stereo pair and removing incorrect corresponding points in the steps (S41-S45) provide optimum relative orientation parameters (exterior orientation parameters) and corresponding points.

The relative orientation is a process in which the relative location and inclination of coordinate axes in the stereo pair are set in similar relationship to that of the image photographing time. Completion of the relative orientation makes it possible to create stereo images that provide stereopsis. Here, the light paths of the same point on two images appear on the same line (or, two lines in space are on the same plane, meeting a co-planar condition). Actually, however, they are displaced off the line due to imperfection. The displacement is called the vertical parallax which is a measure of perfection. In other words, when the coordinate axes and coordinate values are transformed between two images so as to eliminate vertical parallax, the co-planar condition is met to provide an appropriate stereo pair.

Figure 7:
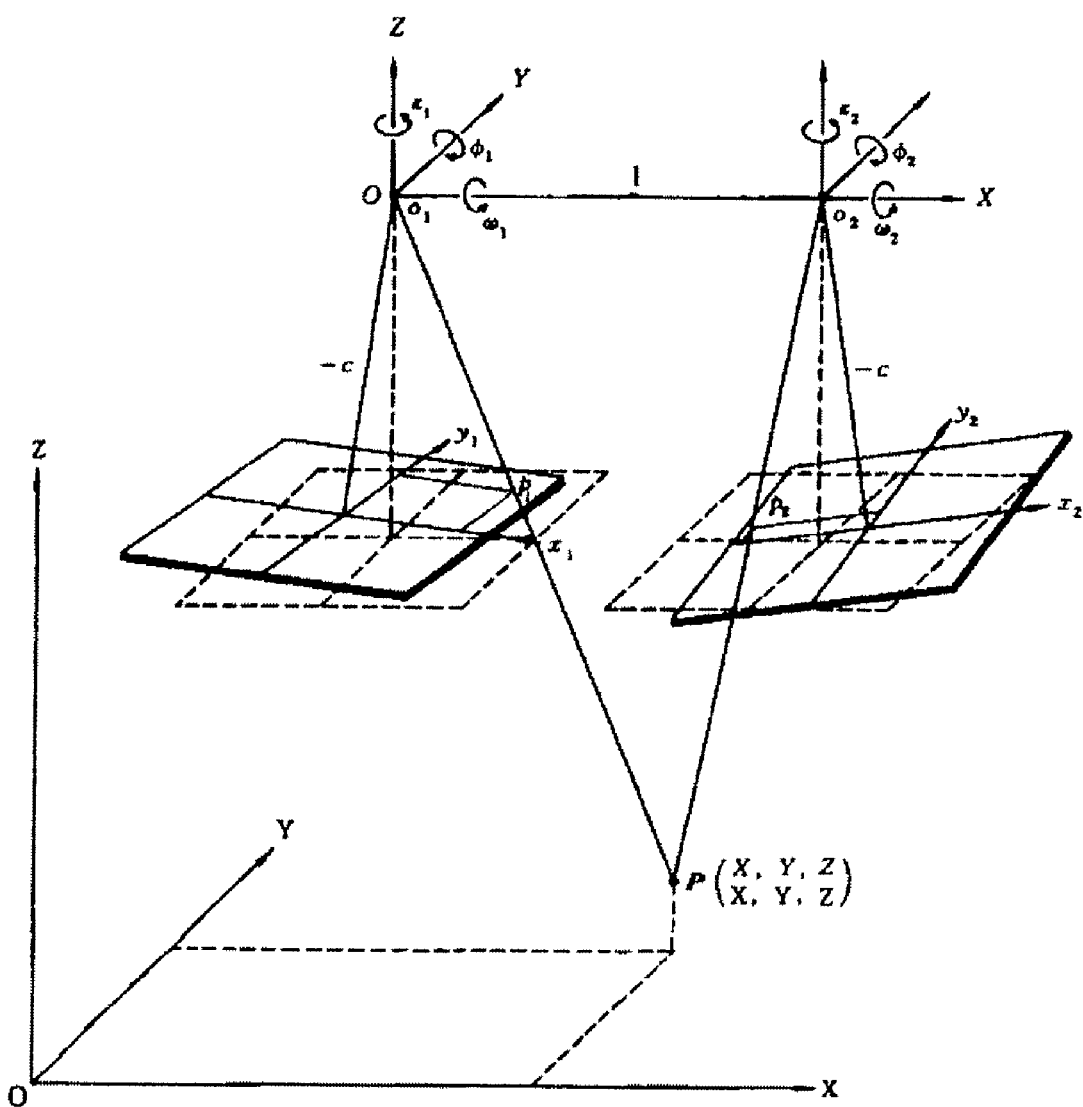
FIG. 7 shows the principle of relative orientation.

Specific steps of relative orientation will be roughly explained. FIG. 7 is showing the relative orientation. In the relative orientation, parameters are determined using the following equation of co-planar condition.

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0 \qquad (2)$$

Where, $X_{01}, Y_{01}, Z_{01}$: coordinates of projection center of a left hand image.

$X_{02}, Y_{02}, Z_{02}$: coordinates of projection center of a right hand image.

$X_1, Y_1, Z_1$: coordinates of the left hand image.

$X_2, Y_2, Z_2$: coordinates of the right hand image.

As shown in FIG. 7, the origin of a model coordinate system (coordinate system of the imaged object) is placed in the center of the left hand projection. A line connecting between the origin and the center of the right hand projection is defined as the X axis. The reduction scale is determined so that the baseline has a unit length. Here, five rotation angle are to be determined as parameters: for the left hand camera $O_1$, rotation angle $\kappa_1$ about Z-axis and rotation angle $\phi_1$ about Y-axis; and for the right hand camera $O_2$, rotation angle $\kappa_2$ about Z-axis, rotation angle $\phi_2$ about Y-axis, and rotation angle $\omega_2$ about X-axis. Here, because the rotation angle $\omega_1$ of the left hand camera is zero, it is unnecessary to take it into consideration. Under the above conditions, the co-planar conditional equation (2) becomes as (3). Solving the equation (3) gives the parameters.

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \quad (3)$$

Between the model XYZ coordinate system and the camera xyz coordinate system, the following equations hold for coordinate $$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} \quad (4)$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \quad (5)$$

$$\begin{pmatrix} \cos\phi_2 & 0 & \sin\phi_2 \\ 0 & 1 & 0 \\ -\sin\phi_2 & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

transformation.

Using the above equations, unknown parameters are determined for example in the following steps.

(1) Approximate initial value is assumed usually to be zero.
(2) The co-planar equation (2) is expanded around the approximate value in a Taylor series into linear form and its differential coefficient value is determined using the equations (4) and (5), to form an observation equation.
(3) Estimation method is applied to determine a correction value for the approximate value.
(4) Correct the approximate value.
(5) Using the corrected approximate value, the above operations (2) to (4) are repeated until the corrected value converges.

Next, in reference to FIG. 4, contents in the first relative orientation process section (S42) will be described. This process is to estimate an appropriate relative orientation parameter by carrying out relative orientation between a chosen stereo pair of image frames. Next, the estimated parameters are used to carry out relative orientation in the second relative orientation process section (S43) to find out and exclude incorrect corresponding points. The results are used to carry out relative orientation (S441) again, evaluate and choose an optimum stereo pair. While incorrect corresponding points are excluded in the tracking process (S20), the process is only two-dimensional and some incorrect corresponding points remain. Therefore, quasi three-dimensional evaluation is made by the relative orientation and the evaluation of vertical parallax so as to leave only appropriate corresponding points.

First, one stereo pair is chosen at random (S41a) out of stereo pair candidates (S41). Next, out of them, a plurality of corresponding points are chosen at random. The number of the corresponding points is five or more (S422). Next, using the five or more corresponding points, a relative orientation is carried out (S423). As a result of relative orientation, relative orientation parameters using those corresponding points are determined. Further it is possible to calculate vertical parallax (difference in coordinate on y-axis vertically intersecting the baseline of each corresponding point after the relative orientation) as an index of error in the relative orientation for each corresponding point. As the magnitude of the vertical parallax serves as the measure of evaluating the appropriateness of the corresponding points, the smaller the magnitude, the better. Here, in order to carry out the evaluation, a median of vertical parallaxes is determined for each corresponding point (S424). The value is compared with a predetermined threshold $\epsilon 2$ (second specified value) (S425). When the value is greater than the specified value, the process goes back to the step S41a to set a new corresponding point. The threshold value at this time is set for example to about 1 pixel. When the value is smaller than the specified value, relative orientation parameters appropriate for this stage are taken as estimated, and the process moves on to the second relative orientation section.

While a case using the algorithm LMedS is described here in which a median is determined and made minimum, the invention is not limited to the above description. It is apparent that the so-called robust estimation method, less affected with error variance, may be widely used.

Next, process details of the second relative orientation section will be described. Here, the results of S42 are received. From the estimated relative orientation parameters, relative orientation is carried out (S430). Vertical parallax value of each corresponding point in the stereo pair frames is calculated (S431). Although corresponding points may be some of the points, most corresponding points are preferable in a frame. Threshold processing is applied to these vertical parallaxes (S432). Corresponding points of vertical parallaxes not smaller than the threshold ($\epsilon 3$) are excluded off the memory 9. The threshold ($\epsilon 3$) this time is set for example to a value of vertical parallax of about 0.5 to 1 pixel. Incidentally, the threshold may be changed depending on required accuracy or objects. In this way, the incorrect corresponding points on the stereo pair are removed.

Next, to evaluate the appropriateness of the stereo pair, relative orientation is carried out again for only the corresponding points excluding incorrect corresponding points (S441), relative orientation parameters are determined, and vertical parallaxes of corresponding points are determined (S442). The median of the vertical parallaxes is compared with a specified value $\epsilon 4$ (fourth specified value) (S443). When the median is greater than the specified value, it means that the stereo pair is inappropriate. Then the process goes back to the step S41a to choose a new stereo pair. When the median is smaller than the threshold, the stereo pair is made an appropriate candidate. The reason for assuming as a 'candidate' here is that there is possibility of the stereo pair being determined later to be inappropriate by a large error removal process in bundle adjustment.

As the robust estimation method, the RANSAC estimation, the M estimation, or their modifications may also be used. These are different from the LMedS in only evaluation method and evaluation function. They are same from the viewpoint that they are less affected with large observation errors.

Incidentally, it is also possible to remove incorrect corresponding points without choosing stereo pairs. In that case, S41a and S44 need not be carried out. Or, the step of S43 only may not be carried out as the selection of appropriate frame. In this case, the steps of 41a and 42 are carried out as the first relative orientation process section and the step of S44 only is carried out as the second relative orientation process section. In other words, the relative orientation parameters are estimated in the step S42 and appropriateness of the optimum frame is determined in the step S44. These are constituted with optimum overall performance according to, for example, speed, error removing ability in the tracking section, objective scenery, and measured objects.

[Bundle Adjustment 1]

Next, focusing on the motion of corresponding points across a plurality of frames, corresponding points and frames with abnormal motion are excluded. Specifically, a plurality of frame images and corresponding points are evaluated with bundle adjustment.

Figure 5:
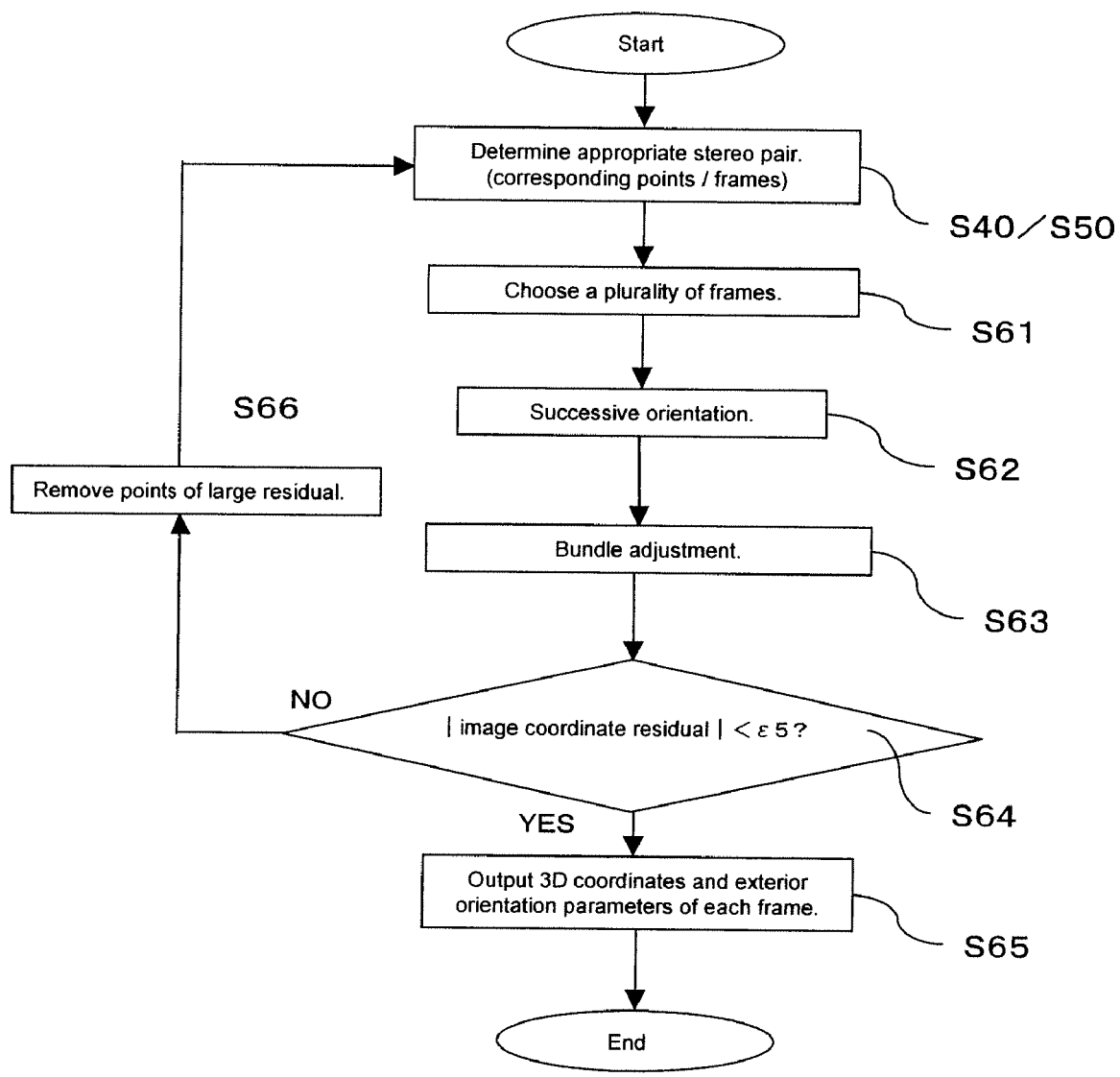
FIG. 5 shows the details of the bundle adjust processing section (step).

FIG. 5 shows the process details. S40 and S50 are steps of removing incorrect corresponding points and choosing optimum stereo pairs by the relative orientation process explained in reference to FIGS. 2 and 4. This process is carried out, following the above steps as a prior process, before the main process. A plurality of frames are chosen out of chosen frames (S61). Next, successive is applied to these frames. The successive orientation is a process in which a coordinate system peculiar to a cubic model created for a stereo pair (model coordinate system) is associated with a neighboring model; tilt and reduction scale are made uniform between each model, to create a uniform coordinate system (course coordinate system). Concretely, with respect to coordinate systems neighboring each other, assuming, for example, coordinates of a point in a right hand model to be $(X_{jr}, Y_{jr}, Z_{jr})$, coordinates of a corresponding point in a left hand model to be $(X_{j1}, Y_{j1}, Z_{j1})$, and coordinates of a camera 2 to be $(X_0, Y_0, Z_0)$, $\Delta X_j$, $\Delta Y_j$, $\Delta Z_j$, and $\Delta D_j$ below are calculated. When $\Delta Z_j$ and $\Delta D_j$ are small enough to be 1/2000 for example, the successive orientation is deemed to have been done correctly.

$$\Delta X_j = (X_{jr} - X_{j1})/(Z_0 - Z_{j1}) \quad (6\,a)$$

$$\Delta Y_j = (Y_{jr} - Y_{j1})/(Z_0 - Z_{j1}) \quad (6\,b)$$

$$\Delta Z_j = (Z_{jr} - Z_{j1})/(Z_0 - Z_{j1}) \quad (6\,c)$$

$$\Delta D_j = (\Delta X_j^2 + \Delta Y_j^2)^{1/2} \quad (6\,d)$$

Next, bundle adjustment is applied to the chosen frame images (S63). With the bundle adjustment, equations are set up to define correlation between a plurality (three or more) of frame images and three-dimensional coordinates to obtain exterior orientation parameters of the images in a bundle. To put it concretely, co-linear conditions (expressed with equations 7a, 7b) or basic conditions of bundle adjustment are used in which the projection center, a photographed image, and an object on the ground are on a straight line. The six exterior orientation parameters $X_0, Y_0, Z_0, \omega, \phi$, and $\kappa$ contained in the equations (7a, 7b) are determined. That is, from image coordinates corresponding to object coordinates of three or more reference points, the six exterior orientation parameters are calculated by successive approximation.

$$x = -c\frac{a_{11}(X - X_0) + a_{12}(Y - Y_0) + a_{13}(Z - Z_0)}{a_{31}(X - X_0) + a_{32}(Y - Y_0) + a_{33}(Z - Z_0)} + \Delta x \quad (7a)$$

$$y = -c\frac{a_{21}(X - X_0) + a_{22}(Y - Y_0) + a_{23}(Z - Z_0)}{a_{31}(X - X_0) + a_{32}(Y - Y_0) + a_{33}(Z - Z_0)} + \Delta y \quad (7b)$$

Where, c: Image plane distance (focal length); x, y: Image coordinates.

X, Y, Z: Space coordinates of the object (reference point, unknown point).

$X_0, Y_0, Z_0$: Taking location of camera 2.

$a_{ij}$: Tilt of camera 2 (3×3 elements of rotary matrix).

$\Delta x, \Delta y$: Terms for correcting internal orientation of camera.

Specifically, a successive approximation method is used in which an approximate value of unknown variable is given, the equations (7a, 7b) are expanded in Taylor series into linear form about the approximate value. A correction amount determined with the least squares method is used to correct the approximate value. The above steps are repeated to determine a converged solution. In this way the six exterior orientation parameters are determined. Further, residuals of the image coordinates of each corresponding point are determined. The residuals are compared with the specified threshold $\epsilon 5$ (fifth specified value). For residuals exceeding the threshold $\epsilon 5$, corresponding points are excluded (S66). The process goes back to the steps S40-S50 to choose an optimum frame (specifically, incorrect corresponding points are removed by relative orientation process and an optimum frame is chosen). When residuals of all the corresponding points are smaller than the threshold, the process is stopped (S64), and three-dimensional coordinates and exterior orientation parameters are outputted (S65) to terminate the process.

[Bundle Adjustment 2]

Figure 6:
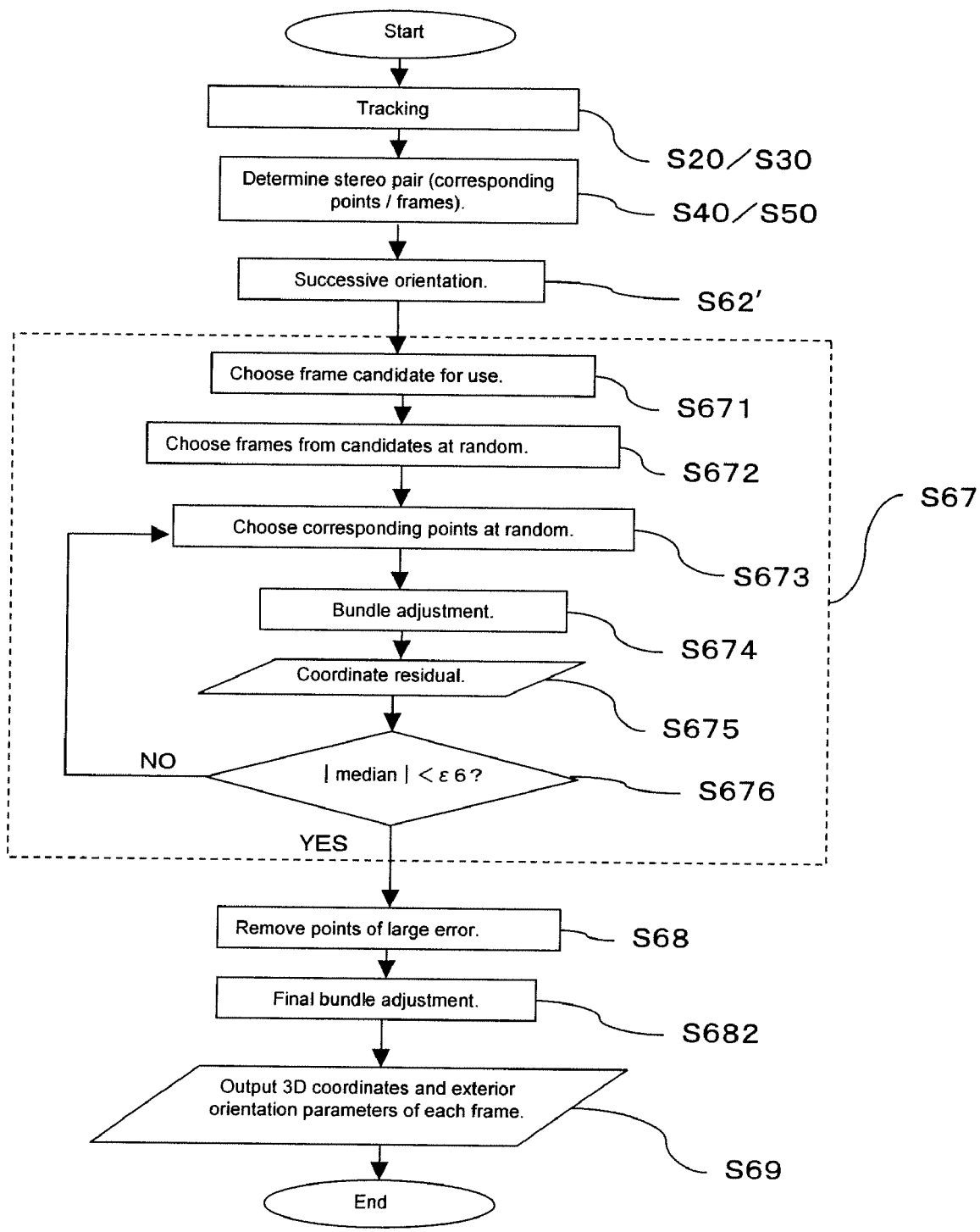
FIG. 6 shows the details of the bundle adjust processing section (step) in another constitution.

FIG. 6 shows another evaluation method using bundle adjustment. With this method, errors in coordinate location data of feature points and errors in frame taking locations are removed to finally obtain three-dimensional coordinates and exterior orientation parameters.

Steps from S20/S30 to S62' are the same as those in the case of FIG. 5. The successive orientation of S62' is the same as the successive orientation S62 of FIG. 5.

Next, robust estimation is applied to coordinate location data of feature points or residuals of frame taking locations obtained in the first bundle adjustment process section (S67) to obtain estimated data of the feature points. In the choice-removal process section (S68), the thresholds of the residuals are determined on the basis of data estimated in the first bundle adjustment process section. Using the determined thresholds, incorrect corresponding points are removed or photographed image frames are chosen. Then, final bundle adjustment is carried out (S682) to obtain the three-dimensional coordinates of the feature points and exterior orientation parameters of respective frames (S69).

The first bundle adjustment process section (S67) will be described below. Candidate frames for use in S671 are chosen. From them, a plurality (three or more) of frames are chosen at random (S672). Usually the number of motion images in video recording is considerably large. While all of them may be used, in consideration of speed and burden on the hardware, it is preferable to select candidates for use. For example, it is possible to sample frames at certain intervals, use frames chosen by the relative orientation process, or those around them. Next, corresponding points (feature points) are chosen at random (S673). The bundle adjustment calculation described before is carried out (S674) to determine coordinate location data of estimated corresponding points and estimated photographing locations of respective frames (these are determined simultaneously). Next, robust estimation reference is calculated. That is, coordinate residuals of points other than those chosen are calculated (S675) and their median is determined and used as a robust estimation reference. The evaluation value in this case is the residual of the estimated point. For example, it is set to about one pixel (S676). This method is the so-called robust estimation method, more specifically the LMedS method described before. That is, residuals of image coordinates of each corresponding point are determined. When the magnitude of the residual of their median is greater than a specified threshold $\epsilon 6$ (sixth specified value), the process goes back to the step S673 to choose a new corresponding point and repeat the same step. When the magnitude of the median is the threshold $\epsilon 6$ or smaller, the process goes to the choosing and removing process section (step) (S68).

In the choosing and removing process section (step) (S68), the estimated coordinate location data or the magnitude of residual of the photographing location determined in the first bundle adjustment process section (step) (S67) is compared with a threshold $\epsilon 7$. When the error of coordinate location data is greater than the threshold, the location is excluded as inappropriate corresponding point (S68). Also, a frame corresponding to a photographing location having an error greater than that is excluded as an inappropriate image frame. The threshold $\epsilon 7$ is set to be for example 0.5 pixels when a high accuracy is required; otherwise about 3 pixels. Next, bundle adjustment is carried out one more time as a final one for corresponding points excluding incorrect ones (S682). Values calculated by the final bundle adjustment in the step S682 are outputted as three-dimensional coordinates and exterior orientation parameters for the respective frames (S69).

In the above description, while the robust estimation is applied to both the selection of frame (according to photographing location) and removal of points (coordinate data) having large errors, it may be applied to either one or both at a time. For example, when the process is heavy loaded, robust estimation for frames may be excluded.

Second Embodiment

Utilization of GPS has become easy in recent years. Systems open to consumer use have been improved in accuracy due to developments of relative locationing system such as DGPS and interference locationing system such as RTK-GPS. The measurement accuracy of the latter has become in the order of several centimeters. This embodiment is to use complementally locationing data from GPS so as to improve overall accuracy and shorten measurement time.

Specifically, there is an example in which GPS data are used for tracking. This is to correlate the location data, measured with GPS, of the camera 2 corresponding to respective frames, with the frames. If the measurement output values of GPS are synchronized with the photographed image frames, a photographed frame when the GPS measurement is outputted is correlated. When they are not synchronized or cannot be synchronized, time stamps of GPS and the camera are utilized to correlate those of the time nearest to each other. Alternatively, a timer may be prepared as hardware. While exact synchronization is ideal, approximate values are also acceptable in this invention.

Figure 8:
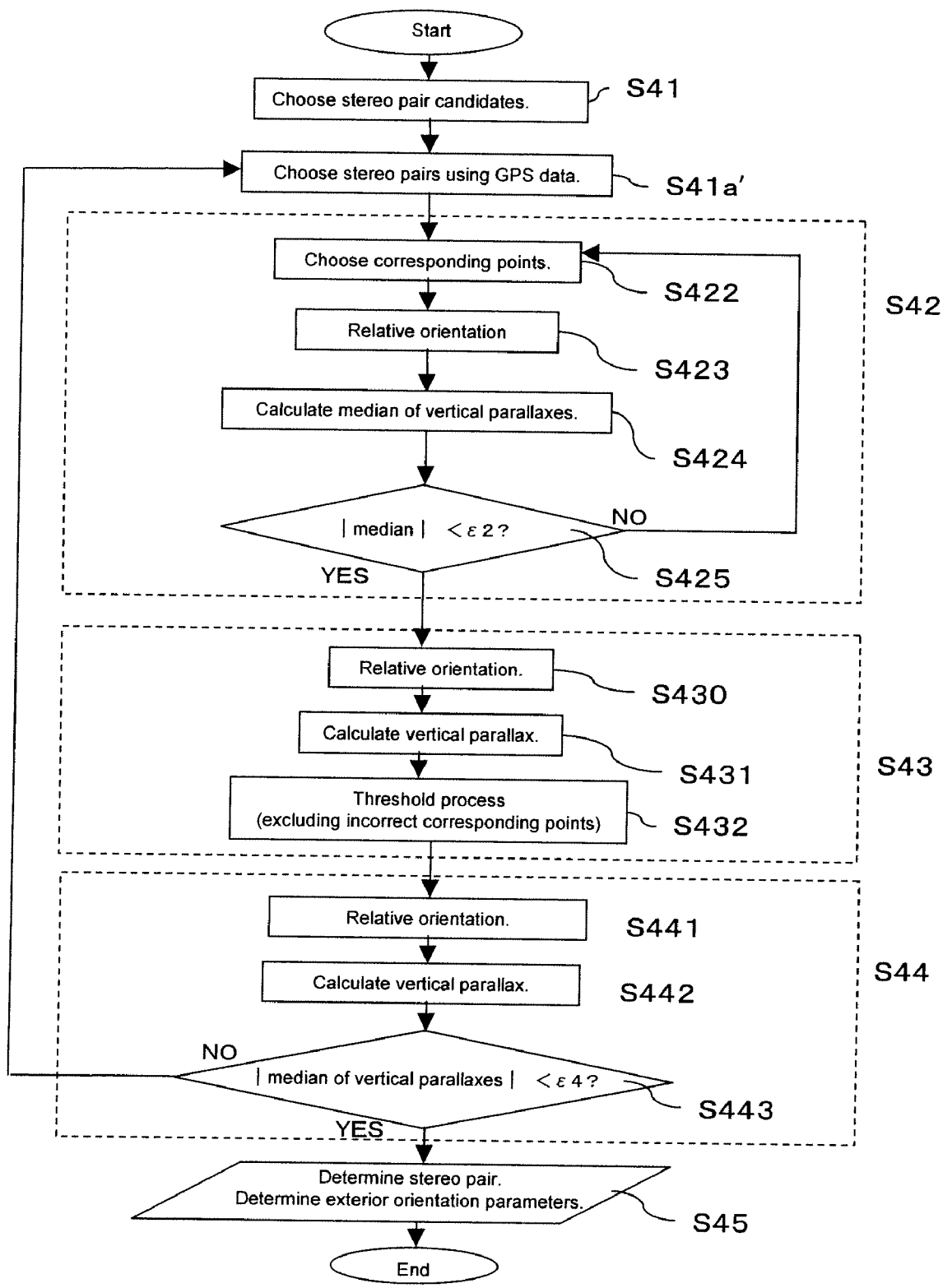
FIG. 8 shows an example of relative orientation process section (step) using GPS data.

GPS data may also be used for choosing stereo pairs. That is, as locations of respective frames are correlated with the location of the camera 2, a frame of appropriate baseline length may be chosen. It is also possible, even if the shooting camera is not exactly synchronized with GPS measurement output values, to apply the robust estimation choice of the frame of this invention and process. FIG. 8 shows a specific application example. In place of S41a in FIG. 4 for random choice, S41a' in FIG. 8 chooses a stereo pair having a sufficient baseline length from the GPS location data of the camera 2. Here, as mentioned before, the baseline length may be an approximate value, even if it is not exactly synchronized and correlated. Constituting in this way prevents useless frames from being chosen. It is also possible to choose appropriate frames without additional hardware for synchronization.

In bundle adjustment, camera location data from GPS are used as initial values. This makes it possible to start calculation from values close to actuality so as to remarkably shorten convergence time.

As described above, with the location measuring device and the location measuring method of this invention, the robust estimation method less affected with large observation errors is applied as a first step to the estimating calculation used in survey using a plurality of photographic digital data. On the basis of the estimation results, incorrect corresponding points and inappropriate frames that cause large errors are removed. After removing the cause of errors, the second step or the final estimating calculation is carried out. Therefore, overall convergence time is short and measurement results are high in accuracy.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising, "having," "including," and "containing" are to be construed as open-ended terms (i.e., meaning including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS

1: operating section
2: image obtaining section (camera)
3: feature point extracting section 4: tracking section
4A: feature point tracking section
4B: first track determining section
4C: second track determining section
4D: template re-matching section
5: relative orientation section
5A: first relative orientation process section
5B: second relative orientation process section
5C: third relative orientation process section
6: bundle adjustment section
6A: first bundle adjustment process section
6B: choice-removal process section
6C: final bundle adjustment section
7: location measuring section
8: display section
9: feature point information memory
10: motion image memory
11: external output section
100: location measuring device
101a, 101b: feature points

What is claimed is:

1. A location measuring device comprising:
a feature point extracting section for extracting a plurality of feature points on a photographing object from each of successively photographed images in a plurality of frames obtained with an image obtaining means, a location of the image obtaining means relatively varying to a location of the photographing object with time;
a feature point tracking section for searching each of the successively photographed images for points corresponding to the feature points and tracking the feature points;
a first track determining section for applying robust estimation to residuals, each of the residuals being a residual of a coordinate calculated by using a set of projection parameters between one and another images on a basis of locational relationship between the feature points on the one and the another images from a process of the tracking or results of the tracking by the feature point tracking section and determining an estimated value of the projection parameters;
a second track determining section for determining a residual between a coordinate of the corresponding point corresponding to each of the feature points and an estimated coordinate of the corresponding point by utilizing the estimated value of the projection parameters determined with the first track determining section, applying a threshold process, determining whether or not the each of feature points is incorrect corresponding point, and removing the incorrect corresponding point from the feature points;
a template re-matching section for determining an estimated coordinate of the corresponding point by utilizing the estimated value of the projection parameters determined with the first track determining section, and carrying out template matching in a vicinity of the estimated coordinate to determine a coordinate of each of appropriate corresponding points, and
a location measuring section for measuring a coordinate of the photographing object, or the location or a photographing posture of the image obtaining means on a basis of coordinates of the corresponding points other than the incorrect corresponding points determined with the second track determining section and on a basis of the coordinates of the appropriate corresponding points determined with the template re-matching section.

2. The location measuring device as recited in claim 1, wherein the robust estimation is one of: LMedS method, median estimation (M estimation) method, and RANSAC (random sample consensus) method.

3. The location measuring device as recited in claim 1, wherein the first track determining section determines a set of projection parameters between the photographed images from a plurality of partial feature points chosen out of the plurality of feature points extracted, calculates coordinates of corresponding points of feature points other than the partial feature points, and determines residuals of the coordinates of the feature points on a basis of the coordinates.

4. The location measuring device as recited in claim 3, wherein the robust estimation employed in the first track determining section is LMedS method: to determine a median of magnitudes of difference in the coordinates for each corresponding point on a basis of the set of projection parameters determined from the partial corresponding points; in which a same process is applied to combinations of other partial corresponding points; to choose a combination of the partial corresponding points that minimizes the determined median; and to determine the projection parameters.

5. The location measuring device as recited in claim 1, wherein the projection parameters in the first track determining section are affine transformation parameters.

6. The location measuring device as recited in claim 1, comprising a GPS location data acquiring section for acquiring photographing location data from GPS data and an operating section for determining correlation between the photographing location data acquired and the photographing location data of respective frame determined in the location measuring section.

7. A location measuring method comprising:
a feature point extracting step of extracting a plurality of feature points on a photographing object from each of successively photographed images in a plurality of frames obtained with an image obtaining means, a location of the image obtaining means relatively varying to a location of the photographing object with time;
a feature point tracking step of searching each of the successively photographed images for points corresponding to the feature points and tracking the feature points;
a first track determination step of applying robust estimation to residuals, each of the residuals being a residual of a coordinate calculated by using the projection parameters between one and another images on a basis of locational relationship between the feature points on the one and another images from a process of the tracking or results of the tracking in the feature point tracking step and determining an estimated value of the projection parameters;
a second track determining step of determining a residual between a coordinate of the corresponding point corresponding to each of the feature points and an estimated coordinate of the corresponding point by utilizing the estimated value of the projection parameters determined in the first track determining step, applying a threshold process, determining whether or not the each of feature points is incorrect corresponding point, and removing the incorrect corresponding point from the feature points;
a template re-matching step of determining an estimated coordinate of the corresponding point by utilizing the estimated value of the projection parameters determined in the first track determination step , and carrying out template matching in a vicinity of the estimated coordinate to determine a coordinate of each of appropriate corresponding points, and a location measuring step of measuring a coordinate of the photographing object, or the location or a photographing posture of the image obtaining means on a basis of coordinates of the corresponding points other than the incorrect corresponding points determined in the second track determining step and on a basis of the coordinates of the appropriate corresponding points determined in the template re-matching step.

\* \* \* \* \*